Patented Mar. 16, 1943

2,314,067

UNITED STATES PATENT OFFICE 2,314,067

PROCESS FOR PRODUCING SULPHUR DIOXIDE-OLEFIN RESINS

Maxwell M. Barnett and John H. Brown, Jr., Port Sulphur, La., assignors to Freeport Sulphur Company, New York, N. Y., a corporation of Delaware No Drawing. Application February 3, 1939, Serial No. 254,380

8 Claims. (Cl. 260—80)

This invention relates to resins of the sulphur dioxide-olefin type and to a new and improved process for producing them.

It has long been known that resinous polymerization products may be produced under proper conditions by the reaction of sulphur dioxide with active unsaturated organic compounds of the olefin type, of which the mono-olefins like ethylene, propylene, butene-1, butene-2, isobutene, pentene-1 and pentene-2 are examples. Other examples of such unsaturated compounds are butadiene, pentadiene and other conjugated diolefins; pentyne-1, hexyne-1 and other acetylenes; and poly-functional unsaturated compounds of the nature of allyl alcohol, vinyl acetate and allyl propionate. This reaction, however, takes place to a substantial extent only under the influence of catalysts. When carried out properly in the presence of a satisfactory catalyst, the reaction produces thermoplastic resins that are valuable for use in the manufacture of molded objects, as bases for lacquers, varnishes, etc., and for other purposes to which plastics are ordinarily applied.

The commercial development of resins of the sulphur dioxide-olefin type has been retarded by the lack of sufficiently active catalysts. Light of the proper wave length, oxidizing compounds such as certain peroxides and silver nitrate, and certain organometallic compounds have been disclosed heretofore as suitable catalytic agents. The known processes involve the reactor of sulphur dioxide and an active unsaturated organic compound, in a sealed glass tube or steel bomb, at comparatively low temperatures and in the presence of sunlight or another of these known catalysts. None of these catalysts, however, is capable of converting the reactants into the desired resinous product in an economically feasible period of time, many hours and even days being required to obtain a satisfactory yield, and in many cases resins are produced which are contaminated or discolored by the catalyst.

One of the objects of our invention is to secure a higher yield of resin than has heretofore been possible in the reaction between sulphur dioxide and unsaturated compounds of the olefin type by providing an exceedingly active catalyst for the reaction.

Another object of our invention is to provide a catalyst for the reaction which results in a high yield of resin within a very short period of time as compared with prior processes, periods of an hour or less being required in accordance with this invention, instead of hours or days.

Another object is to provide a catalyst which is more stable and safer to use than many substances heretofore proposed and which is not liable to undergo explosive decomposition.

A further object of the invention is to provide a catalyst which can be made easily and which avoids the use of low temperatures and solvents in its preparation.

Still another object of our invention is to provide an improved process for producing resins of the sulphur dioxide-olefin type, a catalyst being used in this process which has no contaminating or discoloring effect on the resin product, so that new products having superior qualities for molding and other purposes may be obtained.

Other objects and advantages of the invention may become apparent from the following description.

According to the invention of Maxwell M. Barnett, as disclosed in a copending application, Serial No. 254,381, filed February 3, 1939, the production of sulphur dioxide-olefin resins is carried out by reacting sulphur dioxide with unsaturated organic compounds in the presence of active ozonides as catalysts, particularly an ozonide that has been prepared under anhydrous conditions. In that process several of the objects of the present invention are realized, but disadvantages have been encountered due to the fact that the ozonide catalysts, in general, must be prepared at very low temperatures and extreme care must be exercised in handling and using them because they are so unstable as to be dangerous. For example, the ozonides of ethylene and acrolein are so unstable that they are spontaneously explosive and are sensitive to slight shocks or rises in temperature. The ozonides of butene-1 and butene-2 are useful catalysts, but these materials must be prepared at relatively low temperatures, and, while they are not spontaneously explosive, a slight shock or elevation of temperature is sometimes sufficient to cause detonation.

It has been supposed that the catalytic activity of the ozonides is proportional to the quantity of oxygen contained in the molecule. We have now found, however, that in the case of diisobutylene ozonide the catalytic activity is considerably greater than would be indicated by comparing the quantity of active oxygen in the molecule with the quantity of active oxygen in the molecule of other catalytically active ozonides. We have also found that diisobutylene ozonide is quite stable in comparison with other ozonides and is not liable to undergo explosive decomposition. Thus, this material may be prepared and handled safely without requiring special precautions, and it may be stored for extended periods of time, under conditions that are easy to maintain, without substantial disintegration or loss of catalytic activity. Furthermore, diisobutylene ozonide may be heated to relatively high temperatures without explosive decomposition.

Another important feature of our invention resides in the provision of a catalyst for the sulphur dioxide-olefin reaction which possesses extraordinary catalytic activity and at the same time is quite simple to prepare. In contrast to other ozonides, diisobutylene ozonide can be prepared at room temperatures, whereas most of the other catalytically active ozonides require cooling to temperatures much below normal temperatures in the course of their preparation.

According to the present invention the production of resinous polymerization products through the reaction between sulfur dioxide and active unsaturated organic compounds, such as mono-olefines, is practiced in a commercially feasible manner,—with large yields, a short reaction period and products free from undesirable contamination or discoloration,—by carrying out the reaction in the presence of diisobutylene ozonide as a catalyst.

The resins produced in the practice of this process are remarkably free from contaminants affecting their color or clarity when molded. The product obtained from the container in which the reaction has taken place, after washing or other treatment to remove excess reagents, is capable of being molded into hard, tough and stable objects which are normally colorless and transparent. The product is also valuable as a molding material with or without added substances such as fillers, dyes and color pigments, as a constituent of lacquers, paints, adhesives and other coating compositions, and as a plastic in various fields in which other known plastic materials are employed.

According to the preferred embodiment of the invention, the catalyst employed for the reaction is substantially pure diisobutylene ozonide that has been prepared under substantially anhydrous conditions. We have found that the preparation of the ozonide and its qualities when introduced into the reaction mixture have important effects on the reaction, and that optimum results are obtained only when following this preferred embodiment of the invention.

The preparation of the improved catalyst may be carried out by passing dry or substantially anhydrous ozonized oxygen or air into dry liquid diisobutylene until no more absorption of ozone takes place, which indicates the point of complete conversion to diisobutylene ozonide. In practice, it is advisable to keep the diisobutylene below 10° C. to minimize evaporation losses, although this is in no sense necessary for the ozonization reaction. The catalyst is ready for use when the absorption of ozone has ceased.

We have found that the sulphur dioxide olefin reaction may be carried out in the presence of as low as .01% by weight of the diisobutylene ozonide catalyst. Increasing amounts of the catalyst are effective in increasing the yield and velocity of the reaction until an optimum quantity is attained, which is ordinarily from about .5 to about 1%, by weight. Further increase in the quantity of the catalyst, beyond about 1%, ordinarily fails to increase either the yield or velocity of the reaction, so that optimum results may be secured by the use of very small amounts of the catalytic agent.

The production of the sulphur dioxide-olefin resin, using diisobutylene ozonide as the catalyst, may be carried out as follows: The proper quantity of catalyst, say .25% of the weight of resin which theoretically can be obtained from the sulphur dioxide-olefin reaction, may be weighed and dissolved in a small quantity of an alcohol, or a solution of known concentration may be made in an alcohol or other suitable solvent and an aliquot taken. The diisobutylene ozonide or solution thereof is added to a mixture of sulphur dioxide and olefin in a reaction vessel. If the mixture is at a temperature such that it possesses appreciable vapor pressure, the catalyst should be forced into the vessel with pressure. For most rapid reaction, the temperature of the reaction mixture should be above 0° C.

After the introduction of the diisobutylene ozonide there is an induction period during which no perceptible reaction takes place. This induction period is much shorter according to our process than when using known catalysts, and may vary from a few seconds to a few minutes, from 1 to 2 minutes being the usual duration. Once started, the reaction proceeds rapidly and is substantially complete within one hour.

The addition of the catalyst to the reaction mixture ordinarily takes place in a single operation, the vessel then being sealed. This step, however, may be carried out in other ways, for example, by adding the catalyst in portions as the reaction proceeds.

The process of our invention may be carried out in other ways, and, as long as the diisobutylene ozonide is prepared in the proper condition and used in the proper concentration, the specific manner in which it is used can be varied to suit the conditions and characteristics of the various reagents employed.

The following examples further illustrate suitable manners of practicing our invention.

Example I

A mixture of butene-2 and $SO_2$, in the molar ratio of 1:3, is introduced into a glass container and cooled with dry ice and ether. A weighed quantity of diisobutylene ozonide, dissolved in a volume of ethyl alcohol corresponding to 5% of the volume of the reaction mixture, is then added. The quantity of ozonide used corresponds to 0.5% of the weight of resin theoretically obtainable. The container is sealed off and placed in a water bath maintained at 0–10° C. These limits are not critical, but better yields are obtained if the temperature is not allowed to rise too high. The reaction begins within one to two minutes and results in a conversion of 72% of the olefin to polymer in 10 minutes, and substantially 100% conversion in one hour.

Example II

A glass container is cooled with dry ice and ether, and a mixture of butene-1 and $SO_2$ in the molar ration of 2:1 is introduced. A quantity of diisobutylene ozonide, corresponding to 0.5% of the weight of resin theoretically obtainable, is dissolved in a small quantity of ethyl alcohol and added to the cooled mixture of $SO_2$ and olefin. The container is sealed off and placed in a water bath at 0–10° C. Reaction begins within two minutes and results in the conversion of 85% of the $SO_2$ to resin in one hour.

The resins produced in the practice of our process are not discolored or contaminated by the catalyst or its decomposition products, and in general they may be molded at lower temperatures than resins prepared with other catalysts which have been proposed heretofore. Upon molding these resins, colorless transparent objects are obtained which are hard, tough and stable.

Particular details and examples have been described in this specification in order clearly to set forth suitable manners of practicing our invention. The invention is not restricted to these, but should be accorded a scope commensurate with its contributions to the art as limited only by the requirements of the appended claims.

We claim:

1. The process for producing resins of the sulphur dioxide-olefin type which comprises reacting sulphur dioxide and a compound selected from the group consisting of olefins, pentyne-1, hexyne-1, allyl alcohol, vinyl acetate and allyl propionate in the presence of diisobutylene ozonide as a catalyst.

2. The process for producing resins of the sulphur dioxide-olefin type which comprises reacting sulphur dioxide and a compound selected from the group consisting of olefins, pentyne-1, hexyne-1, allyl alcohol, vinyl acetate and allyl propionate in the presence of diisobutylene ozonide that has been prepared under substantially anhydrous conditions.

3. The process for producing resins of the sulphur dioxide-olefin type which comprises reacting sulphur dioxide and an olefinic compound in the presence of active diisobutylene ozonide that has been prepared under anhydrous conditions, carrying out the reaction in a sealed container, and cooling the container at temperatures between 0° C. and room temperature during the course of the reaction.

4. The process for producing resins of the sulphur dioxide-olefin type which comprises reacting sulphur dioxide and an olefin in the presence of substantially anhydrous diisobutylene ozonide, the reaction mixture initially containing from about .01% to about 1.0% diisobutylene ozonide, by weight.

5. The process for producing resins of the sulphur dioxide-olefin type which comprises introducing substantially anhydrous diisobutylene ozonide into a vessel containing sulphur dioxide and an olefin, sealing the vessel, and permitting the resulting polymerization reaction to proceed.

6. As a new product of manufacture, a sulphur dioxide-olefin resin free from catalytic discoloration consisting of the product of the reaction between sulphur dioxide and olefin in the presence of diisobutylene ozonide.

7. As a new product of manufacture, sulphur dioxide-butene-2 resin free from catalytic discoloration consisting of the product of the reaction between sulphur dioxide and butene-2 in the presence of diisobutylene ozonide.

8. As a new product of manufacture, sulphur dioxide butene-1 resin free from catalytic discoloration consisting of the product of the reaction between sulphur dioxide and butene-1 in the presence of diisobutylene ozonide.

MAXWELL M. BARNETT.
JOHN H. BROWN, Jr.